Oct. 31, 1972  J. L. HENKES, JR  3,701,581
STEREOSCOPIC ENHANCEMENT OF PICTORIAL DISPLAYS
Filed Nov. 15, 1971  3 Sheets-Sheet 1

Inventor:
John L. Henkes Jr.,
by Jame C. Squillaro
His Attorney.

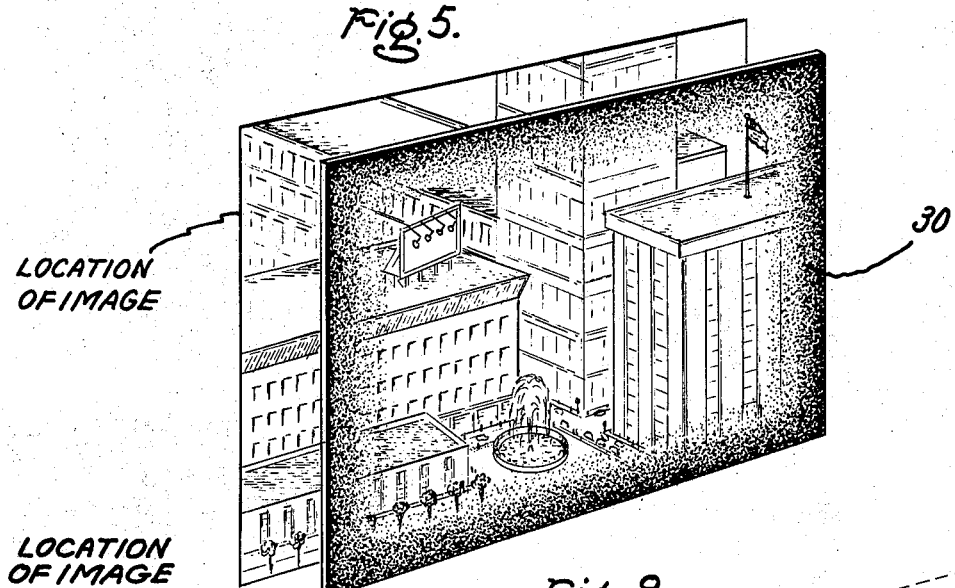
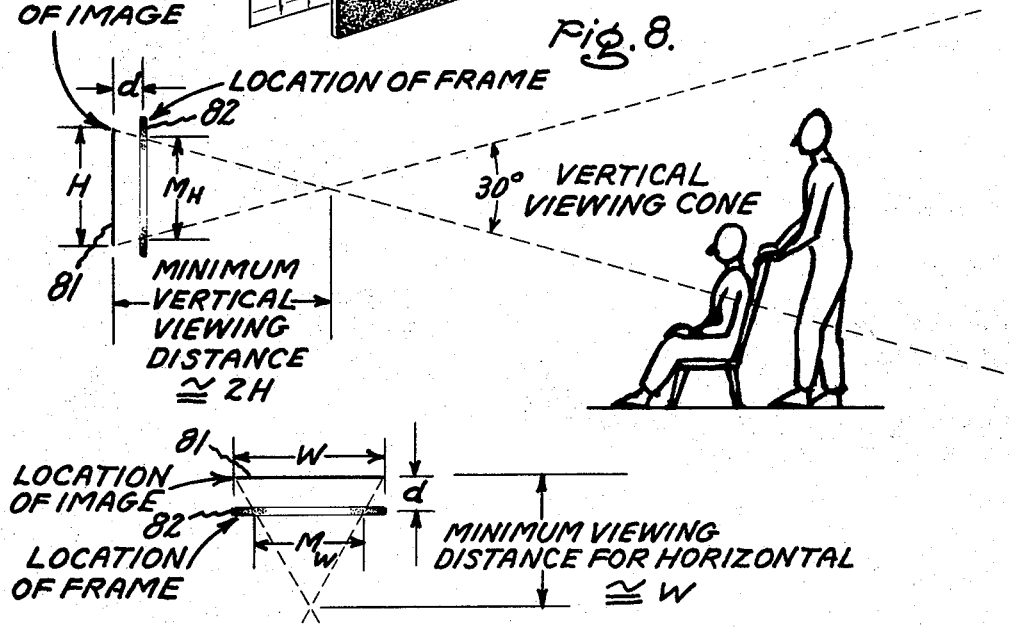

Inventor:
John L. Henkes Jr.,
by Jerome C. Squillaro
His Attorney.

United States Patent Office 3,701,581
Patented Oct. 31, 1972

3,701,581
STEREOSCOPIC ENHANCEMENT OF
PICTORIAL DISPLAYS
John L. Henkes, Jr., Loudonville, N.Y., assignor to
General Electric Company
Filed Nov. 15, 1971, Ser. No. 198,523
Int. Cl. G02b 27/22
U.S. Cl. 350—144
4 Claims

ABSTRACT OF THE DISCLOSURE

Methods and apparatus are described for enhancing the stereoscopic information content of a two-dimensional display surface so that stereoscopic information is perceived with the realism of the original scene. The apparatus includes a stereographic frame surrounding the display and spaced therefrom. The frame, including means for decreasing the scene brightness at a non-linear rate, disassociates the display from the surrounding environment by defocusing the edge of the frame so that it is difficult for the mind of the viewer to determine the distance "$d$" between the frame and the display surface. Suitable spacings $d$ range between approximately $W/40$ and $W/5$, where $W$ is equal to the width of the display surface.

---

The present invention relates to methods and apparatus for rendering pictorial images, such as photographic prints, projected film images, television displays, etc., with the realism that a viewer perceives while observing the original scene.

Pictorial images are most commonly two-dimensional illusions of three-dimensional space, the illusion of depth being achieved through perspective and other extra stereoscopic devices. One of the difficulties in viewing a two-dimensional display in a surrounding three-dimensional environment is that all objects within the scene of the display appear to be "localized" at the plane of the display. This appearance or illusion is further exaggerated by the abrupt change between the display surface and the surrounding three-dimensional environment. For example, television receivers include a frame around the picture tube. This frame accentuates and localizes the display surface. Similarly, a photographically projected image on a screen also suffers from localization of the display surface due to this abrupt change between the viewing surface and the surrounding environment. The existence of a surrounding three-dimensional environment hence makes it exceedingly difficult and generally impossible to perceive a three-dimensional illusion from a two-dimensional display even though the display includes stereoscopic features. This results from the fact that the display surface is positioned in the three-dimensional environment by its association with its frame. Hence, even though the display may include stereoscopic features, they will not be perceived as they were in the original scene.

It is, therefore, an object of my invention to delocalize the pictorial information in a display from its immediately surrounding environment.

It is yet another object of this invention to provide a device which obscures and/or confuses, in the mind of the viewer, the location of the transitional area between pictorial information and its surrounding environment.

It is yet another object of this invention to defocus the edge of the frame so that an association of the frame and a two-dimensional display is substantially impossible.

It is still another object to permit the mind of the viewer to perceive and accept the stereoscopic information from a two-dimensional display with the realism of the original scene.

Briefly, these and other objects of my invention are achieved in accord with one embodiment thereof by providing a stereographic frame which surrounds the pictorial display and disassociates the edge of the display from the surrounding environment by defocusing the edge of the frame. More specifically, I have found that by providing a poorly defined edge between the pictorial display and the surrounding three-dimensional environment, a viewer perceives the stereoscopic information with the realism of the original scene.

In further accord with my invention, the defocused edge of the frame is spaced from the pictorial display surface such that it is difficult for the mind (through binocular vision or head motion, for example) to localize the display surfaces, i.e., to determine the relative distance of the edge of the display from the display surface itself. When this occurs, the stereoscopic relationships of the objects are then accepted by the mind with the realism which a viewer perceives while observing the original scene. More specifically, I have found that by locating the stereographic frame in front of the display surface, the pictorial information is not bound by the frame but appears to continue indefinitely.

The novel features believed characteristic of the present invention are set forth in the appended claims. The invention itself, together with further objects and advantages thereof, may be best understood with reference to the following detailed description taken in connection with the accompanying drawings in which:

FIG. 5 is a perspective view of a stereographic frame in accord with one embodiment of my invention;

FIGS. 8 and 9 illustrate typical vertical and horizontal viewing cones, respectively, when using a stereographic frame in accord with my invention.

Figure 1:
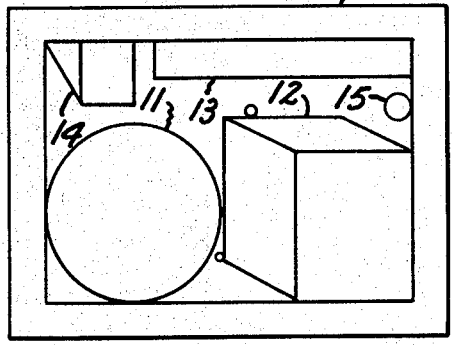
FIG. 1 illustrates a pictorial display with a frame in which the geometrical relation of objects appear to be attached to the frame.

FIG. 1 illustrates a typical two-dimensional pictorial display 10 including a plurality of objects 11 through 15 surrounded by a frame 16. When viewing the pictorial display of FIG. 1, the geometrical objects in the display or scene appear to be connected to the frame 16, thus limiting the scene to the location of the frame. FIG. 1, therefore, is typical of most two-dimensional displays.

Figure 2:
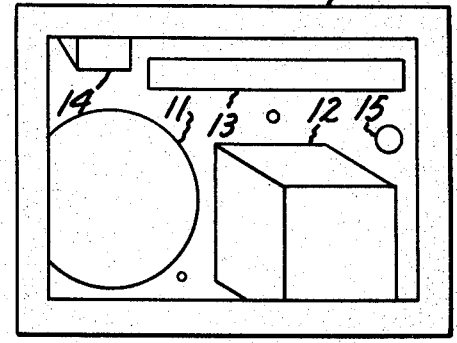
FIG. 2 illustrates a pictorial display with a frame in which the geometric objects appear to be disassociated from the frame.

A more natural, or realistic, scene can be achieved by disassociating the picture or scene from the frame. FIG. 2 illustrates such a frame with the same objects 11 through 15 depicted therein. In this illustration, the objects are disassociated from the frame 16 and hence produce the illusion of a more natural or realistic scene.

Figure 3:
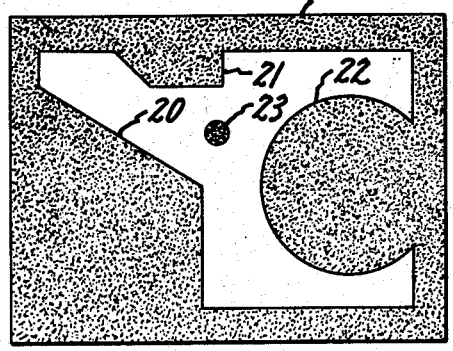
FIG. 3 illustrates a pictorial display with a frame in which tonal shading appears to connect the geometric objects and the frame.

FIG. 3 illustrates the tonal attachment of objects 20 through 23 to the frame 24. Tonal attachment, like geometrical attachment, illustrated in FIG. 1, connects the frame with the objects in the scene and hence limits the scene to the location of the frame.

Figure 4:
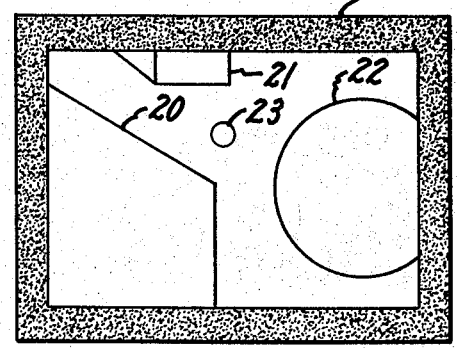
FIG. 4 illustrates a pictorial display of geometric objects in which tonal shading appears to disassociate the objects from the frame.

FIG. 4 illustrates the disassociation of the frame 24 from the objects 20 through 23 in the scene. In FIG. 4, the viewer is uncertain of the specific relationship between the objects in the scene, whereas in FIG. 3, it appears to the viewer that all objects are in the same plane. Accordingly, those skilled in the art can appreciate that by disassociating the frame from the objects in a scene, the precise relationship of objects within the scene is unclear and hence an illusion of realism or stereoscopic effect is produced.

In accord with one embodiment of my invention, I achieve frame and scene disassociation by employing a stereographic frame which surrounds the perimeter of the display area and includes means for decreasing the image brightness at a non-linear rate near the edge of the display, such that the exact edge of the display surface is poorly defined.

The effect of decreasing the image brightness at a non-linear rate near the edge of the display is to obscure the exact location of the transitional area between the display or pictorial information and the surrounding environment. As a result, it is exceedingly difficult for the mind of a viewer to localize and hence determine the distance to the pictorial display. In general, the defocused edge will appear to be spaced further from the display surface than it really is. Consequently, the viewer is able to perceive the stereoscopic information in the display with the realism of the original scene. Further stereoscopic enhancement results from the viewer's binocular vision which permits the viewer to see past or beyond the defocused edge of the frame.

A suitable stereographic frame for practicing my invention is illustrated in FIG. 5. The stereographic frame in accord with this embodiment of my invention includes a substantially transparent film or plate, made of plastic or glass, for example, having an outer perimeter region with a non-linearly decreasing degree of transparency. More specifically, FIG. 5 illustrates a stereographic frame 30 which is substantially opaque near the outermost portions of the perimeter with a non-linearly increasing degree of transparency near the edge of the display area. The stereographic frame 30 therefore terminates nonuniformly near the edge of the display area and hence obscures the exact location of the transitional area between the pictorial information and the surrounding environment. As a result, the mind of the viewer has difficulty in determining the distance to the pictorial display and hence the viewer perceives the stereoscopic information with the realism of the original scene.

To the extent possible in a two-dimensional drawing, FIG. 5 illustrates the enhancement of stereoscopic information in a two-dimensional display by the use of a stereographic frame constructed in accord with one embodiment of my invention. Since the display surface is located behind the frame, the pictorial information is not bound by the edge of the frame and hence the stereoscopic information in the display is accepted by the mind with the realism of the original scene.

Figure 6:
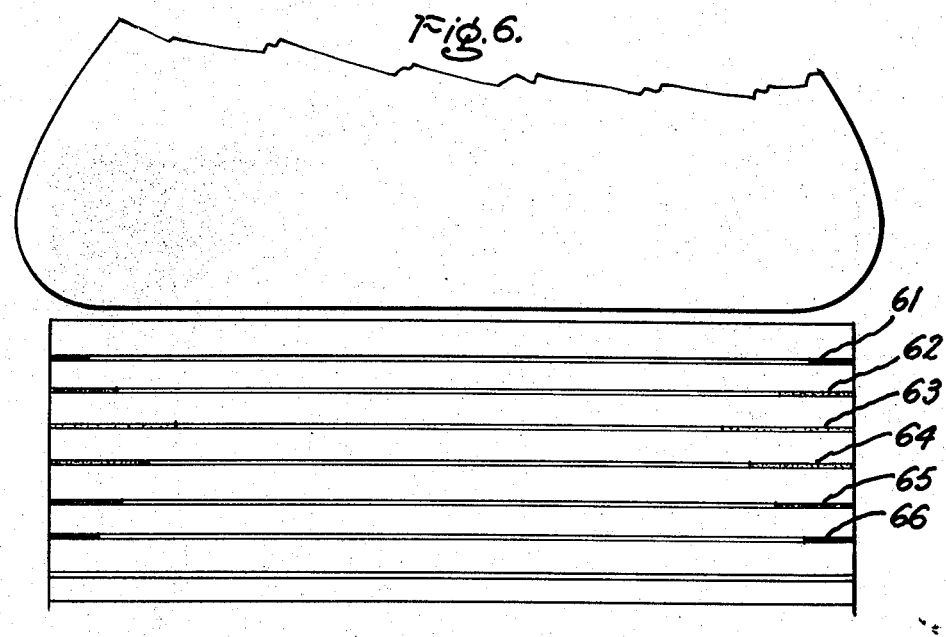
FIG. 6 is a sectional view of another embodiment of my invention including a plurality of frames having different degrees of transparency for effecting frame defocusing.

FIG. 6 illustrates yet another embodiment of a stereographic frame comprising a plurality of films or plates having slightly different degrees of transparency and aligned with each other such that the transitional area between the pictorial display and the surrounding environment is poorly defined.

Figure 7:
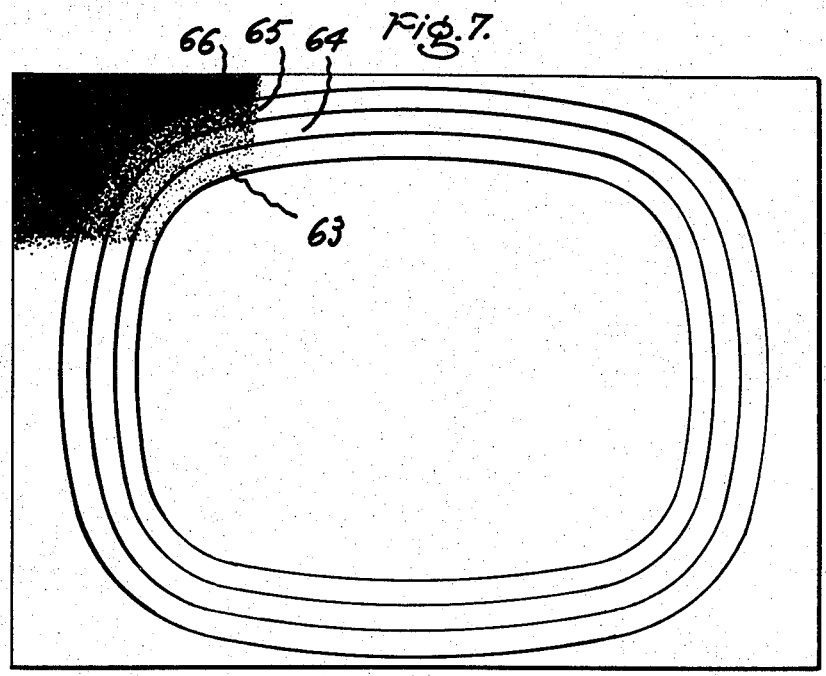
FIG. 7 is a plan view of a pictorial display with a stereographic frame including a plurality of masks of different degrees of transparency.

FIG. 6 illustrates a sectional view of this embodiment of my invention wherein six films or plates of varying degrees of transparency are positioned in front of a cathode ray tube, such as found in a television receiver. The six plates are numbered 61 through 66 with the plates 61 and 66 being substantially opaque while plates 62 through 65 exhibit different degrees of transparency. The result of arranging the plates in this manner produces a stereographic frame illustrated in plan view in FIG. 7. The transitional area between the pictorial display and the surrounding environment is hence defocused in substantially the same manner as that illustrated in FIG. 5.

The relationship between the viewer, the viewing surface and the stereographic frame is illustrated schematically in FIGS. 8 and 9. More specifically, FIG. 8 illustrates a vertical cross-section of a viewing surface 81 having a vertical dimension H and a width dimension W (shown in FIG. 9) with a stereographic frame 82 spaced a distance $d$ from the viewing surface 81. The minimum vertical viewing distance is illustrated as approximately twice the height of the viewing surface, thereby producing a vertical viewing cone with the angle at the apex of the cone being approximately 30 degrees. The minimum horizontal viewing distance, illustrated in FIG. 9, is slightly less than the width of the viewing surface 81 thereby producing a horizontal viewing cone of approximately 60 degrees. Within the viewing cones illustrated in FIGS. 8 and 9, a viewer perceives the stereoscopic information on the viewing screen with the realism of the original scene.

In further accord with my invention, I have found that the illusion of depth is variable, being a minimum where $$d \cong \frac{W}{40}$$

and increasing a maximum where $$d \to \frac{W}{5}$$

The width and height, $M_w$ and $M_h$, respectively, as illustrated in FIGS. 8 and 9 are therefore readily determined, in accord with the desired illusion of depth and the width and height of the display surface. FIGS. 8 and 9 illustrate generally accepted viewing conditions, where the distance between the viewer and the screen is approximately five times the width of the screen. Those skilled in the art can readily appreciate that other horizontal and vertical viewing cones are acceptable and that FIGS. 8 and 9 are merely illustrative of acceptable parameters for the stereographic frame in accord with my invention. For example, the horizontal viewing cone may be appropriately scaled for large variations in viewing screen width and that the horizontal viewing cone may be increased at a reduction of viewing width for any given distance $d$ between the viewing surface 81 and the stereographic frame 82. However, as the distance $d$ is varied, the frame width, $M_w$, must be adjusted to the intercepts of the chosen horizontal viewing cone. Similarly, the stereographic frame height, $M_h$, may also be adjusted in this manner so that the vertical viewing cone may be centered with respect to the viewer's relative height. Accordingly, there is a wide range of useful dimensions for the stereographic frame in accord with my invention, depending in part, on the desired illusion of stereoscopic information.

In summary, I have disclosed a novel apparatus for rendering pictorial images such as photographic prints, projected film images, television displays, etc. with the realism that a viewer perceives while observing the original scene. This is achieved in accord with my invention by employing a stereographic frame which surrounds the pictorial display and appears to the viewer to disassociate the edge of the display from the surrounding environment, thereby permitting the viewer to perceive the stereoscopic information with the realism of the original scene.

What I claim as new and desire to secure by Letters Patent of the United States is:

1. Apparatus for rendering pictorial information from a two-dimensional display with the realism that a viewer perceives while observing the original scene, said apparatus including a stereographic frame positioned in front of and surrounding the two-dimensional display and having a region around the perimeter thereof with a non-linear decreasing transparency, the outermost portions of the frame being substantially opaque.

2. The apparatus of claim 1 wherein the distance $d$ between said frame and said display surface is in the range between $W/40$ and $W/5$, where W is equal to the width of the display.

3. The apparatus of claim 1 wherein said stereographic frame comprises a plurality of films or plates, each having slightly different degrees of transparency and aligned with each other such that the transitional area between the display and the surrounding environment is poorly defined.

4. The apparatus of claim 1 wherein said stereographic frame comprises a substantially transparent plate and where the distance between said frame and said display surface varies linearly with the width of the display.

References Cited
UNITED STATES PATENTS 2,891,440  6/1959  Barake _____ 350—144 X DAVID SCHONBERG, Primary Examiner P. A. SACHER, Assistant Examiner U.S. Cl. X.R.

352—43, 86; 353—10